United States Patent [19]

Sirevag et al.

[11] Patent Number: 5,361,998
[45] Date of Patent: Nov. 8, 1994

[54] PLANT FOR TREATING DRILL CUTTINGS

[76] Inventors: Gunnar Sirevag, Nokkveien 27, 4300 Sandnes; Jon-Arne Seeland, Ovrevollveien 4B, 1342 Jar, both of Norway

[21] Appl. No.: 66,027
[22] PCT Filed: Nov. 20, 1991
[86] PCT No.: PCT/NO/91/0144
 § 371 Date: Sep. 14, 1993
 § 102(e) Date: Sep. 14, 1993
[87] PCT Pub. No.: WO92/09379
 PCT Pub. Date: Jun. 11, 1992

[30] Foreign Application Priority Data

Nov. 28, 1990 [NO] Norway .................. 905157

[51] Int. Cl.$^5$ ............................. B02C 23/12
[52] U.S. Cl. ................ 241/79.1; 241/101.8; 241/46.017; 241/152.2
[58] Field of Search .......... 241/36, 69, 79, 79.1, 241/80, 97, 101.8, 46.01, 46.017, 152.1, 152.2

[56] References Cited

U.S. PATENT DOCUMENTS

| | | | |
|---|---|---|---|
| 269,742 | 12/1882 | Taggart | 241/79.1 X |
| 3,513,100 | 5/1970 | Stogner | 252/301.1 |
| 3,957,210 | 5/1976 | Durr | 241/46.02 |
| 4,632,188 | 12/1986 | Schuh et al. | 166/368 |
| 4,787,452 | 11/1988 | Jennings, Jr. | 166/272 |
| 4,905,915 | 3/1990 | Ikebuchi | 241/80 X |
| 4,942,929 | 7/1990 | Malachosky et al. | 175/66 |
| 5,109,933 | 5/1992 | Jackson | 175/66 |
| 5,251,383 | 10/1993 | Williams | 241/80 X |

FOREIGN PATENT DOCUMENTS

| | | |
|---|---|---|
| 148704 | 8/1983 | Norway . |
| 2179645 | 3/1987 | United Kingdom . |
| 2237273 | 5/1991 | United Kingdom . |
| 2239471 | 7/1991 | United Kingdom . |
| WO80/01497 | 7/1980 | WIPO . |

*Primary Examiner*—Timothy V. Eley
*Attorney, Agent, or Firm*—Foley & Lardner

[57] ABSTRACT

The present invention relates to a plant for treating waste materials, which plant performs a safe and permanent depositing of waste materials as they are treated to obtain an injectable mass which may be injected in porous, underground formations. The plant according to this invention is treating waste materials including substantial portions of solid materials, and in particular drill cuttings, in connection with drill operations in connection with oil and gas wells in marine environments. The plant comprises a crushing machine (1) having two separate input ports (2 and 46), the first (2) primarily adapted for solid materials and the second (46) primarily for liquid materials, and produces a dispersion of diminutive solid particles dispersed in the liquid. The plant comprises possibly feedback means (23, 9 and 25, 35) for solid materials and circulating means (e.g. 31, 40) for the finished dispersion and also injected devices (32, 36, 37, 46).

21 Claims, 3 Drawing Sheets

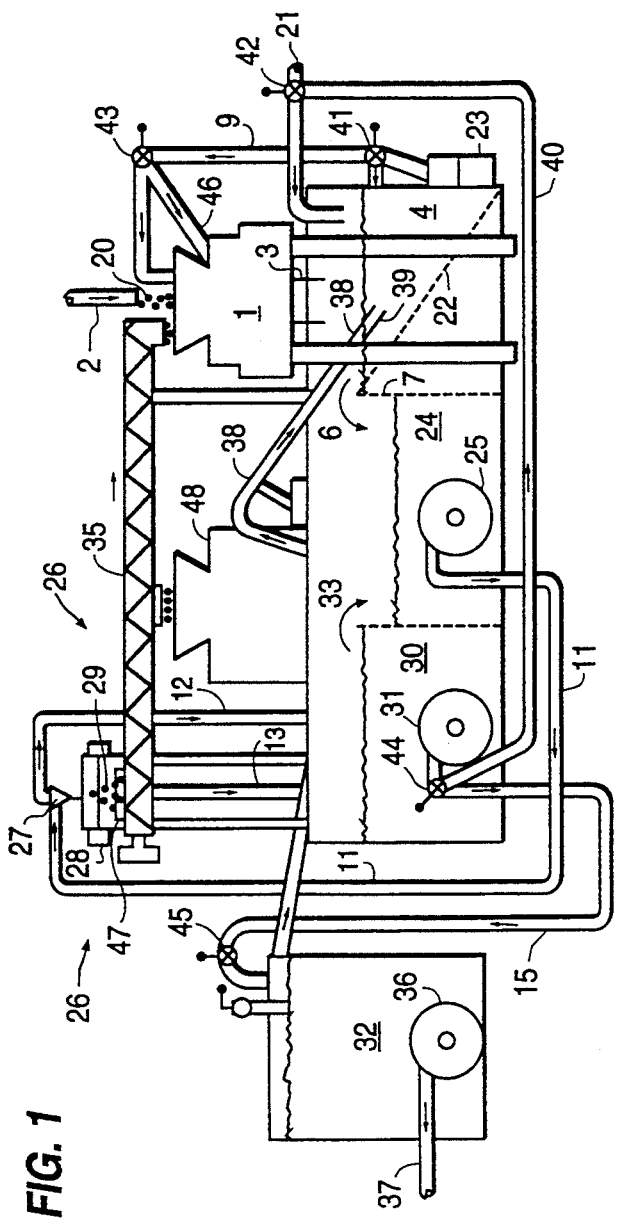

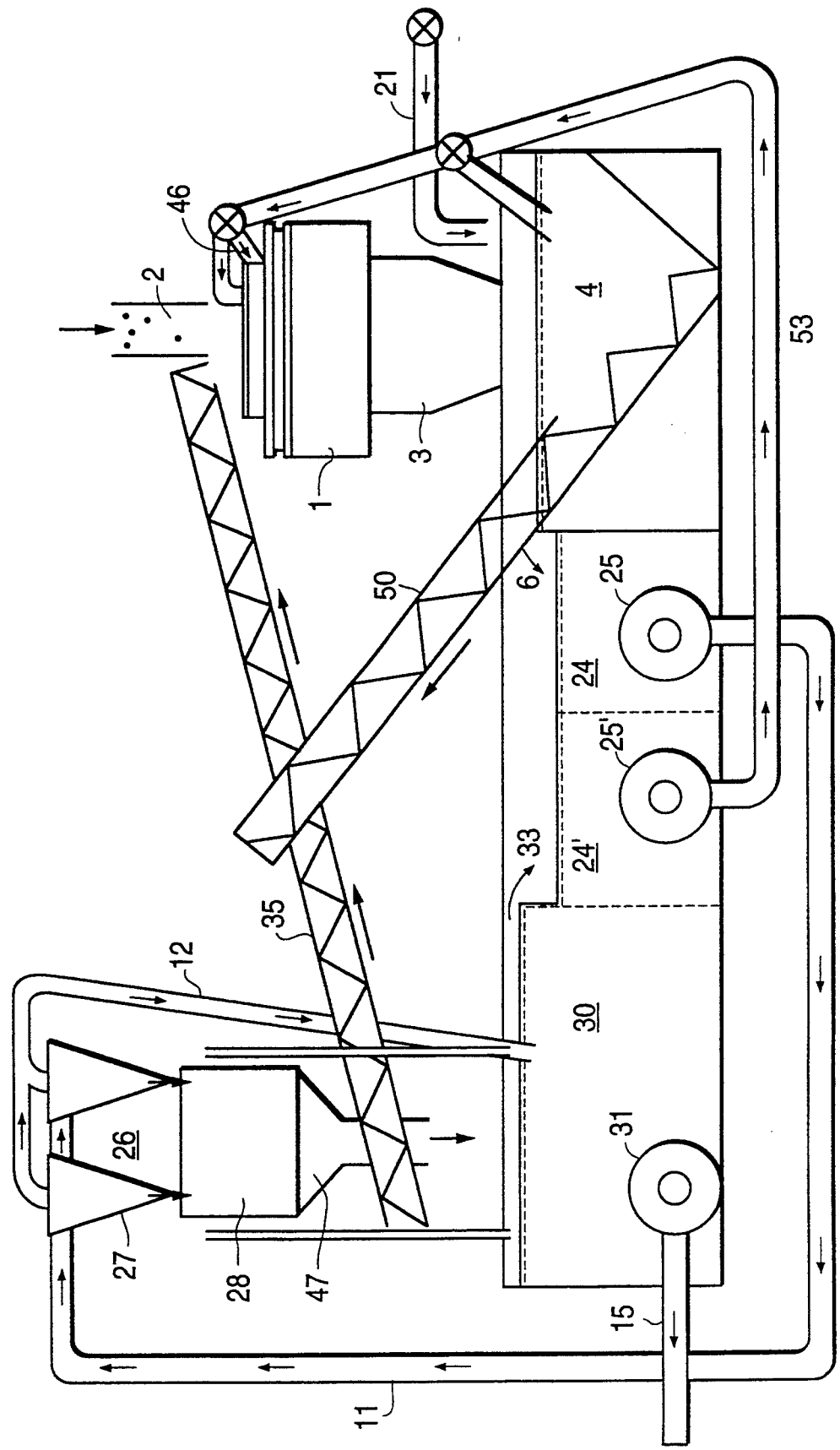

PLANT FOR TREATING DRILL CUTTINGS

BACKGROUND OF THE INVENTION

The present invention relates to a plant for treating drill cuttings obtained during oil and gas drilling, in particular but not only in connection with subsea oil- and gas wells. The plant performs a safe and permanent depositing of drill cuttings without contamination of the environment.

Many different approaches have been made to solve the problem related to disposal of drill cuttings which are brought to the surface by a drilling rig during a drilling operation. Great efforts have been made to clean the drill cuttings to regain valuable components therefrom. The purified drill cuttings have then been dropped back into the ocean. Some earlier suggested solutions may be mentioned such as: cleaning by washing with sea water; formation of pellets; and depositing in a wide, vertically arranged tube which is filled with drill cuttings from above while optionally collecting oil components liberated in the tube. An attempt has also been made to grind drill cuttings in a mill with frictional heat developed during the grinding process used for removing oil components from the drill cuttings by evaporation.

The present invention instead is aiming at obtaining a complete and final treatment of drill cuttings which have surfaced during the drill operation. The drill cuttings are not purified for deposition; on the contrary, the drill cuttings are disintegrated by crushing, i.e., all the constituents in the drill cuttings are kept intact while the crushing is repeated until particles above a certain predetermined size no longer exist. Then these particles are used to obtain a dispersion and/or emulsion, (hereinafter referred to only as a dispersion), in water. This dispersion may finally be forced back into subsea structures by injection, preferably into the same structures from which the drill cuttings initially came with pressures as required according to the structure of the subsea formations at the depths where the injection is undertaken.

Earlier known methods for depositing drill cuttings have first of all led to great contamination problems. These problems are increasing and have recently overwhelmed the cost and time aspects of these proceedings. Earlier on it also has been difficult to find large and suitable deponating sites giving a safe and permanent deposition of the materials in question. By using the same formations in which the materials initially have been kept for thousands or millions of years as a re-storing place, a safe storing place is garanteed. The volume of such a space also are more than satisfactory as large amounts of useable materials have been removed before the re-injection takes place.

As far as we know, it has earlier only been attempted to deposite waste liquids by injection. When solid matters have been included it has always resulted in clogging problems. As far as we know attempts including re-injection of solid materials back to porous formations never have been tested in practice. The solid materials are anticipated to clog the structure and will therefore prevent further infusion. Since such tests are very expensive, they will not be carried out unless a good result is anticipated. The object of the present invention is to obtain a plant for treating and injecting of drill cuttings and other solid/liquid combinations wherein earlier known problems are solved and where expenses and treatment time are lower level than earlier methods obtained by injecting liquids.

The object of the present invention is to obtain a plant for treating drill cuttings and other waste materials in an inexpensive, efficient and fast manner while the above mentioned disadvantages are avoided. This is obtained by designing the plant according to the claims below.

The plant according to the present invention leads to additional advantages as explained below and is designed for treating drill cuttings and similar waste materials, in particular materials surfacing during the drilling for gas and oil.

The plant according to the present invention is characterized in that it comprises:

- at least one crushing machine being provided with at least two input ports; the first input port being especially arranged for receiving a compound having a high percentage of solids, which input port leads directly towards the rotor blades of the crushing machine, while the other input port is arranged to receive a compound having a high percentage of liquids and to lead this compound in between the rotor blades and the stator rim of the crushing machine; and being provided with an output port,
- a mixing receptacle (4) having the output port from the crushing machine arranged as its input port,
- at least one additional container of which the first one is arranged adjacent to the mixing receptacle and is separated from same by a partition,
- at least one feed-back arrangement adopted for guiding at least the solids from the mixing receptacle back to one of the input ports of the crushing machine, and
- at least one injecting device arranged to inject a liquid having solid particles dispersed therein from the last one of the additional containers into a formation in the ground.

According to a specific and simple embodiment of the invention the plant comprises one crushing machine and two containers. The crushing machine is provided with two input ports, one port for inputting solids and one port for inputting liquids, and having one output port leading from the crushing machine to a first mixing receptacle. To this mixing receptacle there is also applied one input port for water, and this is, in parallel with the output port from the crushing machine, led down into the first mixing receptacle. From this mixing receptacle, and preferably from the lower part of same, a feedback pipe transports one portion of the content and in particular a portion having relatively large particle size, back to the input port of the crushing machine. This feedback should preferably be arranged in such a manner that it also results in an agitating of the contents in the first mixing receptacle and may in addition be designed so that the thinner portions of the feedback materials do not necessarily have to pass through the complete process in the crushing machine.

An additional crushing machine may also be provided for the feedback material to treat this in a somewhat different manner. The feedback material may for instance be crushed down to a more fine-meshed particles than in the first mentioned crushing machine.

When the process is started the mixing receptacle will soon be filled up with a mixed compound comprising crushed drill cuttings and water, and this compound will be in continuous motion. The mixing receptacle is provided with an open top and shall therefore flow over when filled up. It should also be mentioned that the mixing receptacle preferably is provided with a slanting bottom and that the feedback compound is collected from the lower part of this slanting bottom which ensures that all the largest particles will be fed backwards in the process and shall not end at this stage. The feedback process preferably is undertaken by means of a vane pump of the centrifugal type having an extraordinary large input port, for example a so called agricultural pump.

The material flowing over from the mixing receptacle will flow further into a second container which may be designated as a "sander" or a sand removing tank. From the "sander" the material is pumped through a sand removing unit which may comprise one or more hydrocyclones, preferably arranged in parallel. From the bottom of these hydrocyclones there will fall out humid particles having a non-classified size, while at the top of the hydrocyclones will flow water including very small-sized particles from the crushed drill cuttings dispersed therein. The dispersion which comprises fine drill cuttings together with water, may then be conveyed to a third container which may be referred to as an output tank. From the output tank the dispersion is pumped further to the last tank which may be referred to as an injection tank. The pump used may also here preferably be a so called agricultural pump. If the output tank is flowing over, the overflow shall be guided through an overflow connection back to the sand removing unit.

Considering particles which fall out below the hydrocyclones, these will fall down into a collecting pan after passing through the meshes in an optional, vibrating screen which passes only particles having a size less than a predetermined value given by the mesh size. The particles which fall through the screen are also led down in the output tank, i.e. together with the dispersion entering from the upper part of the hydrocyclone(s). The larger particles which do not pass through the meshes of the vibrating screen, are transferred to a conveyer for solid particles and via this conveyer the larger particles are led to further stages in the process. However different alternatives exist for further handling of those larger particles, within the scope of the present invention.

The plant may for instance be equipped in such a manner that the conveyer transports the larger, solid particles directly back to the input port of the crushing machine so that the particles have to pass through the process an additional time.

A further possibility is letting the conveyer guide the particles to a different kind of crushing machine than the one already used. This second crusher may for instance be a mill particulary designed for sand milling, and from this mill the sand obtained may again be guided down into the mixing receptacle together with the earlier mentioned crushed drill cuttings which have passed the initial crushing machine.

Still a further possibility shall be mentioned as the larger, solid particles may be guided to a conveyer of the sand-washing type, where the particles are cleaned by water flowing in the opposite direction, so that the particles are completely pure when arriving at the opposite end of the conveyer. Using this technique the separated larger and solid particles may, after cleaning and washing, be led directly back into the water surrounding the platform, without any danger for the environment, while the separated waste liquid is guided backwards to the output tank.

As mentioned above the screen may represent an optional solution. If a screen is not used, all the underflow from the hydrocyclone(s) may be guided back to the mixing receptacle or to the sand removing tank, preferably close to a pump input carrying the underflow again into a feedback process or a circulating process according to the claims below.

If the dispersion which was pumped from the output tank to the injection tank now is considered, this dispersion shall preferably be collected in batches. Because of this it is preferred to use at least two injection tanks with only one injection tank is filled at the time. The dispersion which arrives at the injection tank has preferably none, or at least only a few particles having a diameter above 75 micron. If the dispersion comprises redundant water this may be guided via an overflow back to the output tank or even back to the sand removing tank or the mixing receptacle.

When an injection tank is filled up by a dispersion having the desired qualities, the filling of this tank is stopped while filling of the next tank begins. While the next tank is being filled, the content in the first injection tank which now is filled up, may be guided into a piston pump generating the pressure required to pump this fine-grained dispersion into the subsea structures according to existing depths and existing porosity of the formations at this site. Thereafter a pump, which may be a high pressure pump, and a tube/pipe system enduring the pressure in question are used to empty the contents from the injection tank and squeeze it into a suitable subsea structure. Then this injection tank will again be ready for a new filling operation. The pump may possibly be a pressure booster.

The plant described, in accordance to the present invention, leads to a high speed treatment of drill cuttings. This treatment may be continous even if the dispersion is handled in batches since feedback of redundant material from earlier stages in the process continually prevent clogging in the plant. Bottlenecks in which the manufacturing of the dispersion comes to a stop, do not exist. To this end it is important that all the pumps are open vane pumps having large input and output ports which are not easily clogged by course materials passing therethrough. To obtain such a function the crushing machine may also be designed in such a manner that objects having a size exceeding the pump capacity are not allowed to pass.

It should also be mentioned that the feedback of compound from the mixing receptacle preferably is undertaken in such a manner that one portion of the compound is guided back to a gun or jet, which at high pressure but with a certain dispersive effect from a movable nozzle, may inject a stream of feedback material into the mixing receptacle generating a whirling and stirring process in the mixing reseptacle. A different portion of the feedback compound may be led to the crushing machine between the rotor and the stationary outer rim, which gives a so called autogenous crushing since different sized particles are crushed when hitting each other at high velocities and high kinetic energy. The larger feedback particles are guided directly into the main input port of the crushing machine.

In this connection it should be mentioned that a crushing machine preferably could be operated more efficiently when additional grinding elements are put into the system. Such grinding elements may consist of small steel balls or elements having a more random shape such as short pieces of reinforcement rods. Such grinding elements circulate in a closed loop within the plant and do not pass through to the output port. Such grinding elements therefore shall only be consumed by regular wear and abrasion.

The working principles of this plant will be understood from the description above. The principal stages in the process are described below.

Drill cuttings which have not been treated, possibly mixed up with sand, water and slurry or mud from the drilling operation is guided through the crushing machine. Additional water may be added to obtain a compound of suitable consistency. In this compound there may partly be undertaken one or more feedback operations in directions towards the crushing machine and/or partly one or more circulations in the forward direction towards the injection tanks. Thus the mixed up compound will circulate within the plant as the larger particles are continuously forcedly crushed again and again, while the compound is continually thickening until a stable dispersion of desired consistensy, suitable for injection, has been obtained.

BRIEF DESCRIPTION OF THE DRAWINGS

To give a clearer understanding of said invention reference is made to the detailed description below, showing some embodiments, and to the accompanying drawings in which:

FIG. 1 illustrates a side view of a preferred embodiment of the present invention, FIG. 2 illustrates the embodiment according to FIG. 1, seen from above, and FIGS. 3 and 4 illustrates additional alternative embodiments of said invention.

DETAILED DESCRIPTION OF THE PREFERRED EMBODMIENT

Figure 3:
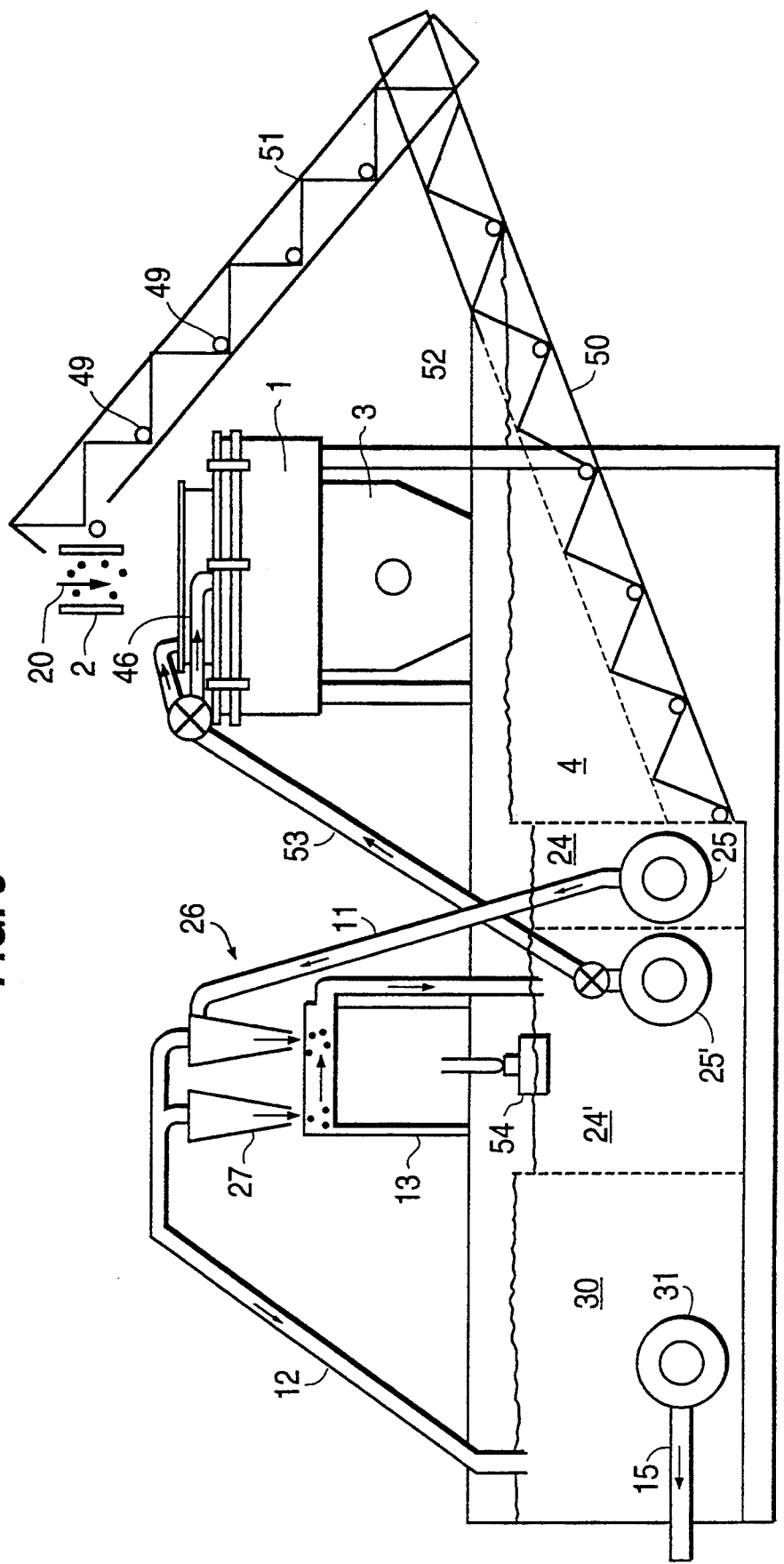

The same reference numbers are used in all figures where applicable.

In FIGS. 1 and 2 raw drill cuttings, possibly mixed with water and slurry from the drilling operation, are led down into the input port 2 of the crushing machine 1, primarily adapted for receiving solid matters. The crushed compound comes out in the mixing receptacle 4 where the largest particles, due to a slanting bottom 22 are gathered at one side of the mixing receptacle. From there the compound is guided directly into the pump 23 which is of the vane type having a large opening in its side wall. From here the mixed up compound is fed backwards and upwards and is fed through the valve 41, partly to a feedback gun 38 being provided with a nozzle 39. Both the nozzle 39 and the gun 38 are movably arranged and vigorously stir the contents of the mixing receptacle 4, so that no particles may settle and therefore clog the process. Another portion of the feedback compound is guided further up to the valve 43 wherefrom it again divides into a first flow being guided to the main input port on the top of the crushing machine 1, primarily adapted for the supply of solids, and into a second, partial flow through a branched pipe leading towards a side input 46 on the crushing machine 1. The side input 46 is mainly adapted for receiving feedback liquid. The larger particles are guided through the main input port on the top of the crushing machine, hit the rotor blades and are agitated by same. The compound entering through the side input will fall down between the rotor and its house, and solid matter coming along this path collides with the particles already being agitated. Together with this stream of compound arriving the side input 46 a large quantum of liquid or liquified dispersion is introduced, and the latter shall therefore not engage the blades of the rotor directly. The liquid shall therefore not take as much energy from the crushing machine as it would have done if it had entered through the upper input port and from there had fallen directly down onto the blades of the rotor. As the particles obtain vigorous movements in different directions an autogenous crushing will result, during which the particles are crushed when colliding. The crushing machine preferably is an autogenous crushing mill, for instance of the type BARMAC.

The feedback process (23,41,9,43,1), which results in the effect that some portions of the bulk passing through the process are treated several times while other portions of the bulk are allowed to pass directly through, being completely treated after only one pass, represents an important principle related to this invention. Corresponding or similar feedback loops are found in other places in the equipment and are already mentioned in the above description of the plant.

The feedback process related to the mixing receptacle 4 and the crushing machine 1 should now be sufficiently described. The overflow from the mixing receptacle 4 flows into the sand removing tank 24, as shown by the arrow 6, and comprises substantially fine particles; however a few, somewhat coarser particles may also be included. The compound has at this stage a very low viscosity and comprises large amounts of redundant water. In addition the sand removing tank 24 receives a feedback overflow 33 from the subsequent dispersion tank or output tank 30. The content of the sand removing tank 24 is pumped via a further vane pump 25 arranged at the side of this tank, through the conveyer tube 11 to the sand removing unit 26. The sand removing unit 26 may comprise one more known hydrocyclones 27 which are funnel-shaped containers in which the compound is pumped tangentially at a high velocity so that within the funnel is generated a downward directed whirl or cyclone resulting in the gathering of heavier particles along the sides of said funnel. These heavier particles slide further downwards to the bottom of the funnel from which they fall out and down into a gathering pan (not shown on the figure), while the main flow of floating compound, unable to be squeezed out through the small hole in the bottom of the funnel, turns upwards and is forced through an upper output port which via the dispersion tube 12 leads to the output tank 30. One single hydrocyclone 27 may be used if it has sufficient capacity to treat the amount of liquid entering through the transfer tube 11, or a sufficient number of hydrocyclones may be used arranged in parallel. The dispersion which is moving through the dispersion tube 12 and down into the output tank 30, includes small particles only. The compounds which have fallen out from the bottom of the hydrocyclone(s) to the gathering pan 47, not shown on the figures, may fall down onto a vibrating screen having a predetermined and constant mesh size. Only the particles having a diameter less than the mesh size will fall down through the screen and shall via the conveyer 13 be guided into the output tank 30. The particles which do not pass the meshes in the screen are instead guided to a conveyer device, preferably a helix conveyer 35 which then transports the largest particles back to the crushing machine, or alternately to a separate mill or second crushing machine 48 for grinding or powdering of sand and stone particles. FIGS. 1 to 2 show such a second crushing machine 48.

FIG. 3 illustrates schematically a further embodiment of said invention. Quite a lot of the reference numbers are the same as used in the above described figures. In accordance with this and also the next figures, the differences in relation to the already discussed solution in the FIGS. 1 and 2 are emphasized.

Considering the embodiment according to FIG. 3 a twin helical conveyer 50, 51 is used within a feedback system from the mixing receptacle 4. According to this the upper part of the mixing receptacle 4 is extended somewhat in the sideways directions, as assumed by numeral 52, to leave sufficient space for the conveyer.

According to this embodiment of the feedback system the diluted compound in the mixing receptacle 4 is not agitated as much as in the first embodiment. The advantage of this is that overflow (suggested by arrow 6) into the sand removing container 24 includes an amount of large solid particles even less than in the first shown embodiment. This situation results in a higher risk of sedimentation and settlement at the bottom of the mixing receptacle 4. However, such sedimentation is in turn avoided by means of the helical conveyer 50. This conveyer, which is at the same level as a bottom of the mixing receptacle 4, will ensure that all settled and sedimented material are fed to the input port of the crushing machine 1 via the conveyer 51.

A further difference between the embodiment of FIG. 3 and the embodiment of FIGS. 1 and 2, is that there no longer is any liquid or water input directly to the mixer receptacle 4. The required amount of liquid is instead obtained partly because the bulk 20 at the input port 2 comprises liquids, partly because the plant initially is filled up with liquid, and partly because a more or less finished dispersion is fed back from a further container 24' by means of the pump 25' and the feedback pipe 53 which feed dispersion backwards to the input port of the crushing machine 1. Optionally only one or both methods may be used to supply liquids. The dispersion is, as earlier explained, partly supplied to the main input port primarily designed to receive solids at the top of the crushing machine, partly supplied to the input port 46 facing sideways and mainly meant for liquid masses. The liquid and dispersion thus will enter the mixing receptacle 4 and lead to a further tickening of the circulating, diluted mixture.

In FIG. 3 the additional grinding elements 49 mentioned above are also suggested. These elements will be guided by the conveyers 50 and 51 from the bottom of the mixing receptacle 4 and will fall, together with the solids, into the input port of the crushing machine, and will here contribute to a more efficient crushing process. The grinding elements 49 never leave the loop passing from the mixing receptacle via the conveyers 50 and 51 and back to the mixing receptacle 4.

From FIG. 3 it is also seen that the sand removing tank 24 now is replaced by one or two further containers 24 and 24'. In FIG. 3 it is shown to arrange a partition between the containers 24 and 24', however this partition has the further purpose of keeping dispersions of different densities separated, and may be removed without considerable negative influence on the plant. In the container 24 it is also shown a further pump 25 which still pumps the dispersion entering from the overflow leaving the mixing receptacle 4 forward in the process, to a classifying device 26 also referred to as the sand removing device. This device may, as earlier suggested, comprise one or more hydrocyclones and its operation is similar to the one earlier described, however neither a screen nor a conveyer leading backwards to the crushing machine 1 has now been used. This design therefore represents a more simple embodiment as the feedback material is carried directly down into the container 24'. It should be noted that the larger solid particles being separated by the hydrocyclone(s) now fall directly through the feedback arrangement 13 which now is designed to ensure that the coarser particles fall down close to the input port of pump 25' and substantially are caught by this and fed back to the crushing machine 1. Therefore the feedback loop will remain substantially unchanged while the equipment which provides the feedback operation has a rather different implementation.

On this figure a float 54 is also shown, which detects the level of the liquid or the dispersion in the container 24' or in both containers 24 and 24'. Signals initiated by this float 54 may start and stop the pumps 25' and possibly 25 in such a manner that the liquid level in the container(s) 24 (possibly also 24') always will remain below the liquid levels in the mixing receptacle 4 as well as in the output tank 30. It should also be mentioned that the plant may be further simplified as the output tank 30, possibly may be replaced by two output tanks working in parallel (not shown), and such tanks may be used directly as injecting tanks. In this way the total number of containers in the plant may be reduced. Finally it may be mentioned that such a plant may be manufactured as a mobile, autonomous unit which in a simple manner may be transported and installed where required. In this manner the plant also may work on land based productional sites or may work as a completely autonomous plant taking care of different waste materials on an efficient, fast, inexpensive and first of all safe manner.

The embodiment shown in FIG. 4 comprises some features already described in connection with FIGS. 1 and 2, and other features already described with reference to FIG. 3. It may now therefore be sufficient to mention that liquid supply enters both from the outer side via the input port 21 and via the conveyer 35 for solids entering from the classifying device 26, here shown in an embodiment having a screen 28 and a gathering pan 47. Apart from these details the principle is as explained above.

Using a plant according to the present invention it will be ensured that the resulting dispersion only comprises particles having a size of 100 micron or less. In a test plant, using Barmac autogenous crushing mill with a verticle shaft, 95% of the drill cuttings had a size less than 100 micron and no particles larger than 1 mm in diameter passed the crushing machine after the first circulation.

According to the present invention an apparatus suited for marine use has been developed from equipment earlier related to land-based mining operation. Another advantage is that an apparatus according to this invention is a very fast acting device and it may for instance be mentioned that 7.7 tons of drill cuttings may be treated each hour using one centrifugal mill having two separately arranged input ports. With minor modifications this apparatus may handle 15 tons of drill cuttings each hour. Even if this apparatus in an unmodified version is unable to mill sand comprising fine particles only, and only may crush drill cuttings comprising coarser particles, this problem is also solved in the present invention by feeding the sand backwards to a separate arranged sand mill. Depending of the pore structure in the formation in which the injection shall take place the sand may in some cases be kept in the finished dispersion which are to be injected, thus without any special crushing of existing sand particles.

We claim:

1. Apparatus for treating waste material from drilling operations comprising:
   1) a crushing device having a first input port for receiving materials having a relatively high proportion of solids and a second input port for receiving materials having a relatively high proportion of fluid as compared to said first input port, said crushing device further having an outlet port,
   2) said crushing device having rotor blades positioned adjacent said first input port for crushing said solids in said waste materials,
   3) a mixing chamber having an input port position to receive the crushed solids and fluid from the output port of said crushing device,
   4) at least one additional chamber positioned to receive overflow of fluid and solid particles dispersed therein from said mixing chamber,
   5) at least one feedback device connected between said mixing chamber and said crushing device, and
   6) at least one injecting device in fluid communication with said additional chamber and arranged to inject said liquid and solid particles dispersed therein from said additional chamber into a subterranean formation.

2. Apparatus as recited in claim 1 further comprising a first circulating device arranged to circulate liquid and solids from the at least one additional chamber back toward the crushing device.

3. Apparatus as recited in claim 2 further comprising a second circulating device arranged to circulate liquids and solids from said at least one additional chamber forward in a direction away from said crushing device.

4. Apparatus as recited in claim 3 further comprising at least one separating device adapted to separate heavier particles from lighter particles, said separating device included in at least one of said first and second circulating devices.

5. Apparatus as recited in claim 3 wherein said crushing device comprises a centrifugal crusher.

6. Apparatus as recited in claim 2 further comprising at least one separating device adapted to separate heavier particles from lighter particles, said separating device included in said first circulating device.

7. Apparatus as recited in claim 6 wherein said crushing device comprises a centrifugal crusher.

8. Apparatus as recited in claim 2 wherein said crushing device comprises a centrifugal crusher.

9. Apparatus as recited in claim 1 further comprising a second circulating device arranged to circulate liquids and solids from said at least one additional chamber forward in a direction away from said crushing device.

10. Apparatus as recited in claim 9 further comprising at least one separating device adapted to separate heavier particles from lighter particles, said separating device including said second circulating device.

11. Apparatus as recited in claim 9 wherein said crushing device comprises a centrifugal crusher.

12. Apparatus as recited in claim 1 wherein said crushing device comprises a centrifugal crusher.

13. Apparatus as recited in claim 1 further comprising a second crushing device, wherein said second crushing device comprises a mill crusher for crushing small and hard particles.

14. Apparatus as recited in claim 1 further comprising a partition between the mixing chamber and the at least one additional chamber, said fluid level in said additional chamber maintained at a sufficiently low level to permit fluid and solid particles dispersed therein to flow over said petition from said mixing chamber to said additional chamber.

15. Apparatus as recited in claim 1 wherein said at least one additional chamber comprises first and second additional chambers, said first additional chamber positioned to receive overflow fluid and solid particles from said mixing chamber, and said second additional chamber positioned to receive fluid and solid particles from said first additional chamber, said injecting device being in fluid communication with said second additional chamber.

16. Apparatus as recited in claim 15 wherein said second additional chamber is included in a circulation system wherein it receives a flow of fluid and dispersed solids from said first additional chamber and feeds back a flow comprising liquid and solids to said first additional chamber.

17. Apparatus as recited in claim 15 wherein at least one of said first and second chambers are provided with a floating means which controls the start and stop operations of pumps associated with said chambers.

18. Apparatus as recited in claim 1 wherein said feedback device comprises at least one conveyor for transporting solids back to the first input port of the crushing device and a further conveyor for transporting liquids including coarse particles back toward the second input port of said crushing device.

19. Apparatus as recited in claim 18 wherein said conveyor comprises one of a helical, grab, or belt conveyor and the further conveyor transporting liquids including coarse particles comprises conduits and open vane pumps.

20. Apparatus as recited in claim 1 further comprising grinding elements to assist in the crushing process of the solids, said grinding elements passing through the crushing device together with said solids.

21. Apparatus as recited in claim 1 wherein said at least one injecting device comprises two injecting containers which are filled and emptied in a batchwise fashion.

* * * * *